Sept. 27, 1960
E. J. LENNEY
2,954,108
SPRING CLUTCH MECHANISM
Filed May 7, 1958
2 Sheets-Sheet 2
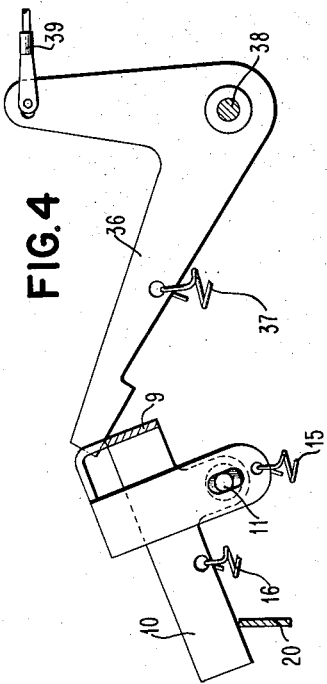
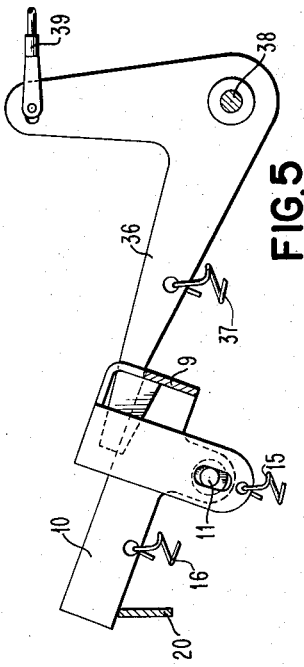
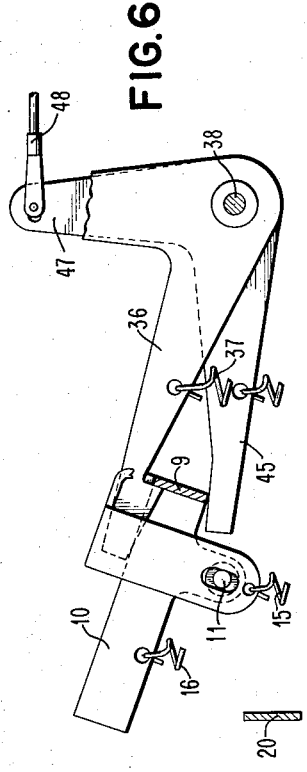
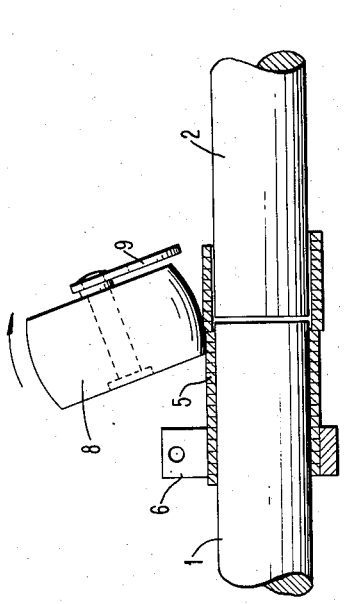
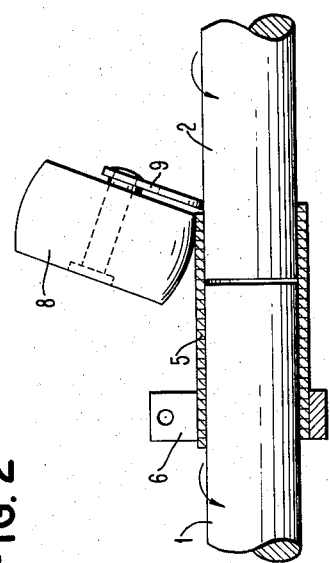
*INVENTOR.*
EDWIN J. LENNEY
BY Ralph C. Dustin
ATTORNEY

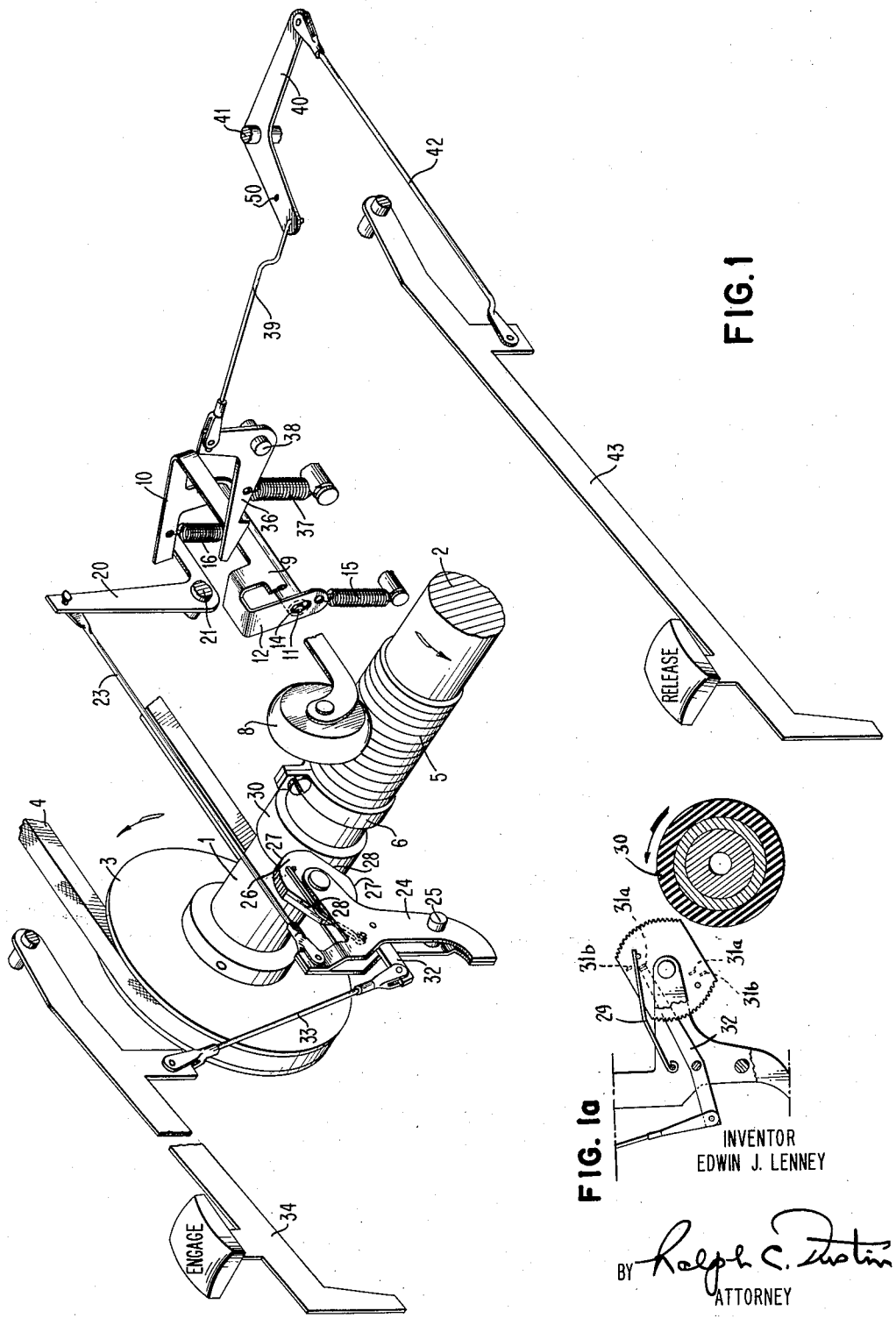

United States Patent Office 2,954,108
Patented Sept. 27, 1960

2,954,108

SPRING CLUTCH MECHANISM

Edwin J. Lenney, Lexington, Ky., assignor to International Business Machines Corporation, New York, N.Y., a corporation of New York Filed May 7, 1958, Ser. No. 733,631

7 Claims. (Cl. 192—81)

This invention relates to clutch mechanisms, and more particularly to clutch mechanisms which are operable to pick up or drop the load gradually as a driven member is connected to or disconnected from a driving member.

Upon actuating a clutch mechanism to connect a driving member to a driven member, it is sometimes desirable that a clutching operation take place in such a manner that excessive loads are avoided. This requires that some slipping action take place between the operating parts of the clutch mechanism. Such action may be obtained by providing a spring coiled about portions of both members in a direction opposite to the direction of rotation of the driving member and being formed so that its turns are normally free of the members. One end of the spring may be clamped to the driving member, and a clutch element may be arranged for movement from a position in which it holds the spring against the driving member toward the free end of the spring so that it moves turns of the latter progressively into engagement with the driven member. Upon engagement of the first turn with the driven member, the spring is caused to wrap itself tightly about the driving member and to apply a low torque to the driven member. As the clutch element continues to move turns of the spring into engagement with the driven member, the torque on the latter increases until the desired driving operation is obtained.

For moving the clutch element to engage the spring progressively with the driven member, there may be provided a cam which is releasable by a manually actuated key to engage a power roll on the driving member. The cam is operatively connected to the clutch element and is so shaped that it operates upon actuation by the power roll to engage the clutch so as to pick up the load in the desired manner. The clutch may then be latched in its applied position until a release key is actuated. At this time, the cam element may be operated either to disengage the turns progressively from the driven member or to release the clutch spring completely so that the driving connections are abruptly terminated. Only a slight wearing of the parts results from the operation of a clutch mechanism of this type, and the design is such that good operation is obtained even when the parts have been worn substantially. The cam may be designed to actuate the clutch element so as to increase the driving torque in any manner desired, and, when a change in the application of the clutch becomes necessary, the cam may be easily replaced by another of different shape.

An object of this invention is to provide an improved clutch mechanism.

Another object is to provide a clutch mechanism which is operable to increase driving torque on the driven member in a predetermined manner.

Still another object is to provide an improved spring clutch mechanism having clutch element which is operable to engage turns of the spring progressively with a driven member.

Yet another object is to provide an improved clutch mechanism having a spring which is connected at one end to a driving member and is moved progressively into engagement with a driven member by a clutch element operating under control of a power actuated cam.

Other objects of the invention will be pointed out in the following description and claims and illustrated in the accompanying drawings, which disclose, by way of example, the principle of the invention and the best mode, which has been contemplated, of applying the principle.

In the drawings:

Figure 1 is a schematic diagram showing the improved clutch mechanism operable under the control of manually actuated keys.

Fig. 1a is a side elevational view, partly in section, showing details of the cam mechanism in Fig. 1.

Figure 2 is a front elevational view of the clutch mechanism with the clutch spring shown in section and the clutch actuating element shown in its normal clutch-disengaging position.

Figure 3 is like Figure 2 except that the clutch actuating element has been moved to a position for engaging turns of the spring with the driven member.

Figure 4 is a view showing mechanism for latching the clutch element in its clutch-engaging position.

Figure 5 is a view like Figure 4 but showing the mechanism latched in clutch-engaging position.

Figure 6 shows a modified form of the invention in which the clutch actuating element is lifted free of the spring for effecting immediate disengagement of the clutch.

Referring to the drawings, and more particularly to Figure 1, it will be noted that there is shown an improved clutch mechanism for controlling the connection of a drive shaft 1 in driving relation with a shaft 2. The shaft 1 is rotatably supported by any suitable means, not shown, and has connected to it a pulley 3 which is driven continuously in the direction of the arrow by a belt 4. Shaft 2 is arranged in axial alignment with shaft 1 and is also rotatably supported by means not shown. Surrounding the adjacent portions of shafts 1 and 2 is a helical clutch spring 5 which is wound from left to right in a direction opposite to the direction of rotation of the shaft 1. This spring is so wound that it normally provides a slight clearance between the inner surface of its turns and the peripheries of the shaft 1 and 2. The left hand end of the spring is firmly secured to the drive shaft 1 by a clamp 6. It will be appreciated that the spring 5 rotates continuously with the shaft 1 but does not normally transmit rotation to the shaft 2 since a clearance exists between the spring and shaft 2 as shown in Figure 2.

Cooperating with the clutch spring is a roller 8 having a peripheral surface which is curved transversely as shown in Figures 2 and 3. This roller is rotatably supported by an arm 9 extending perpendicular to the shafts 1 and 2, and a rear arm portion 10 is bent at right angles and has a loose pivotal connection to a stationary shaft 11. The connection to the shaft is such that the arm 9 may either be rocked about the shaft axis or be rocked at the pivotal connection on an axis perpendicular to the shaft a sufficient distance to move the roller 8 clear of the spring 5. Formed on the arm 9 is a flange 12 having a slot 14 through which the shaft 11 projects. The slot 14 is formed so as to permit a rocking of the arm 9 in a direction perpendicular to the shafts 1 and 2 and to hold the arm against movement in a direction longitudinally of the shafts. Connected to the lower end of the flange 12 is a spring 15 which operates to rock the arm 9 in a direction to engage the roller 8 with the clutch spring 5. Connected to the arm portion 16 is a spring 16 which tends to rock the arm 9 about the shaft 11 to a position in which the roller 8 is tilted to the left, as shown in Figure 2. When the roller 8 is in this position, its peripheral surface engages turns on the clutch spring 5 overlying the drive shaft 1 and adjacent the end of the latter.

As the arm 9 is rocked in a clockwise direction about the shaft 11, the roller 8 is tilted toward the right to move turns on the clutch spring progressively into engagement with the shaft 2. Since the shaft 1 and the clutch spring are rotating during the tilting of the roller 8, the surface of the spring engaging the shaft 2 may be increased in a straight line ratio if the roller 8 is tilted so that its point of contact with the clutch spring moves the distance between adjacent turns during one revolution of the shaft. If a faster pick-up load is desired, the roller 8 may be tilted more rapidly to engage the turns of the clutch spring with the shaft 3. As soon as any portion of the spring engages the shaft 2, the friction produced between the rotating spring and the stationary shaft causes the spring to wrap itself tightly about the drive shaft 1. A slight torque is also produced tending to rotate the shaft 2. As the surface contact between the spring and shaft 2 increases, the spring tends to wrap itself about the shaft 2 and the torque increases until the shaft 2 rotates with shaft 1. The tilting of the roller 8 may be terminated at points which effects driving of the shaft 2 but which permits slipping of the clutch on any predetermined overload.

For rocking the arm 9 about the axis of the shaft 11 to tilt the roller 8 in a clutch-applying direction, there is provided a bell crank 20 pivotally supported at 21, and having one of its arms underlying the bent portion 10 of the arm 9. The other arm of the bell crank is connected by a link 23 to a frame 24 pivotally supported at 25. Rotatably supported by the frame is a cam 26 having high dwells 27 and low dwells 28. A spring arm 29 tends to rotate the cam in a clockwise direction to engage one of its high dwells with a sleeve 30 made of any suitable material, such as rubber, and mounted on the shaft 1 to rotate therewith. Pivotally supported by the frame 24 is a lever 32 engageable with any one of two sets of lugs 31a, 31b at diametrically opposite points on one side of the cam for latching the latter in positions so that one or the other of the low dwells is adjacent the sleeve 30. This cam mechanism is commonly used and is shown and described in detail by Patent 1,777,055, issued to R. G. Thompson. Further description herein is believed to be unnecessary. The lever 32 is connected by a link 33 to a key lever 34 which may be operated manually to release the cam for engagement with the sleeve 30.

Upon release of the cam by actuation of the key lever, the cam is driven by the sleeve 30 to effect a rocking of the frame 24 in a counter-clockwise direction. As the next low dwell on the cam comes into a position opposite the sleeve 30, the lever 32 engages one of the lugs on the cam and holds the latter free of the sleeve until the key lever is again depressed. The rocking of the frame 24 causes an actuation of the bell crank 20 to swing the arm 9 about the shaft 11 for tilting the roller 8 from the position of Figure 2 to the position of Figure 3. During this time, the roller operates to press the turns of the clutch spring against the shafts 1 and 2 as a result of the action of spring 15 on the arm 9.

For holding the roller 8 in its clutch engaging position, there is provided a latch 36 having a nose portion normally engaging the upper edge of the arm 9, as shown in Figures 1 and 4. The latch is urged by a spring 37 about its pivot 38 in a direction to effect a latching engagement with the arm 9 when the latter is rocked about the shaft 11 to a position in which the clutch is engaged. A tail portion of the latch is connected by a link 39 to a bell crank 40 pivotally supported at 41 and connected by a link 42 to a release key lever 43.

To disengage the clutch, the key lever 43 is depressed to effect a rocking of the bell crank 40 so as to disengage the latch 36 from the arm 9. The spring 16 then rocks the arm about the shaft 11 to tilt the roller 8 to the position shown in Figure 4. This operation results in a successive release of the turns on the clutch spring engaging the shaft 2 and provides a gradual declutching action.

It may be desirable at times to lift the roller 8 from its position in Figure 3 directly away from the clutch spring so as to terminate abruptly the driving of the shaft 2. This may be accomplished by providing, as shown in Figure 6, a bell crank 45 mounted on the pivot 38 with the latch 36 and having one of its arms extending under the arm 9. Another arm 47 on the bell crank 45 is connected by a link 48 to the bell crank 40 at a point 50 located between the pivot 41 and the point at which the link 39 is connected. As the bell crank 40 is actuated by a depression of the release key, the latch 36 and the bell crank 45 are both rocked about the pivot 38 in a clockwise direction. The arm 9 is lifted by the bell crank 45, and the latch 36 tends to release the arm for rocking motion about the shaft 11. Since the latch is connected by the link 39 to the bell crank 40 at a point spaced further from the pivot 41 than the point at which the link 48 is connected, then the latch is moved angularly a greater distance than the bell crank 45 for a given rotation of the bell crank 40. It will be appreciated that the latch will release the arm 9 after the latter has been moved by the bell crank 45 to a position where the roller 8 is free of the clutch spring. The arm 9 is then rocked to tilt the roller to the left while it is held out of engagement with the clutch spring. Upon release of the key lever 43, the bell crank 45 pivots counter clockwise to engage the roller 8 with the clutch spring in the position shown in Figure 2.

While there have been shown and described the fundamental novel features of the invention as applied to a preferred embodiment, it will be understood that various omissions and substitutions and changes in the form and details of the device illustrated may be made by those skilled in the art without departing from the spirit of the invention. It is the intention therefore, to be limited only as indicated by the scope of the following claims.

What is claimed is:

1. A clutch mechanism for connecting a driving member to a driven member comprising, in combination, a helical clutch spring having turns extending about portions of said driving and driven members in a direction opposite to the direction of rotation of said driving member, said spring having an internal diameter slightly greater than the diameter of said driven member, means connecting one end of said clutch spring to said driving member, a clutch element for forcing turns on said spring against said driving and driven members, and means for moving said clutch element from a position holding spring turns against said driving member toward the free end of said spring so as to force turns of the latter progressively into engagement with said driven member.

2. A clutch mechanism for connecting a drive shaft to a driven shaft arranged coaxially therewith comprising, in combination, a helical clutch spring having turns extending about adjacent portions of said shafts in a direction opposite to the direction of rotation of said drive shaft, said spring having an internal diameter slightly greater than the diameter of said driven shaft, means connecting one end of said spring to said drive shaft, a clutch element engageable with turns on said spring for forcing them against said shafts, means for moving said clutch element from a position forcing turns against said drive shaft toward the free end of said spring so as to force turns of the latter progressively into engagement with said driven shaft, and means for latching said clutch element in a position in which it holds turns on said spring in engagement with said driven shaft.

3. A clutch mechanism for connecting a driving member to a driven member comprising, in combination, a helical clutch spring having turns extending about portions of said driving and driven members in a direction opposite to the direction of rotation of said driving member, said spring having an internal diameter slightly greater than the diameter of said driven member, means connecting one end of said clutch spring to said driving member, a roller engageable with turns on said clutch spring for forcing them against said driving and driven members, said roller having a convex peripheral surface transversely to its sides, means normally supporting said roller with points on its surface adjacent one side engaging spring turns overlying said driving member, and means for actuating said supporting means so as to rock said roller transversely to a position in which points on its surface adjacent its opposite side engage spring turns overlying said driving member, said roller operating during its rocking motion to move turns of said spring progressively into engagement with said driven member.

4. The mechanism of claim 3 including a latch, means engaging said latch with said supporting means for holding said roller in a position engaging turns of said spring with said driven member, and manually actuated means for disengaging said latch from said supporting means.

5. The mechanism of claim 4 including a member, means for moving said member with said latch for lifting said roller to a position free of said clutch spring before an unlatching operation takes place.

6. A clutch mechanism for connecting a drive shaft to a driven shaft arranged coaxially therewith comprising, in combination, a helical clutch spring having turns extending about adjacent portions of said shafts in a direction opposite to the direction of rotation of said drive shaft, said spring having an internal diameter slightly greater than the diameter of said driven shaft, means connecting one end of said spring to said drive shaft, an arm extending perpendicular to said shafts, a roller engageable with turns on said clutch spring and supported by said arm for rotation on an axis perpendicular thereto, said roller having a convex perpiheral surface transversely to its sides, means yieldingly urging said arm in a direction to press said roller against turns on said clutch spring, and means for rocking said arm so as to tilt said roller from a position engaging spring turns over said drive shaft to a position engaging spring turns over said driven shaft.

7. The mechanism of claim 6 in which said means for rocking said arm comprises a cam operatively engageable with said drive shaft to be driven thereby, means operatively connecting said cam to said arm for rocking the latter when said cam is driven by said drive shaft, and manually actuated means controlling the engagement of said cam with said drive shaft.

References Cited in the file of this patent

UNITED STATES PATENTS

| | | |
|---|---|---|
| 867,324 | Warner | Oct. 1, 1907 |
| 1,714,496 | Chilton | May 28, 1929 |
| 1,836,199 | Starkey | Dec. 15, 1931 |
| 1,973,671 | Stevenson | Sept. 11, 1934 |
| 1,985,387 | Starkey | Dec. 25, 1934 |
| 2,052,961 | Bonham | Sept. 1, 1936 |
| 2,257,987 | Starkey | Oct. 7, 1941 |